UNITED STATES PATENT OFFICE.

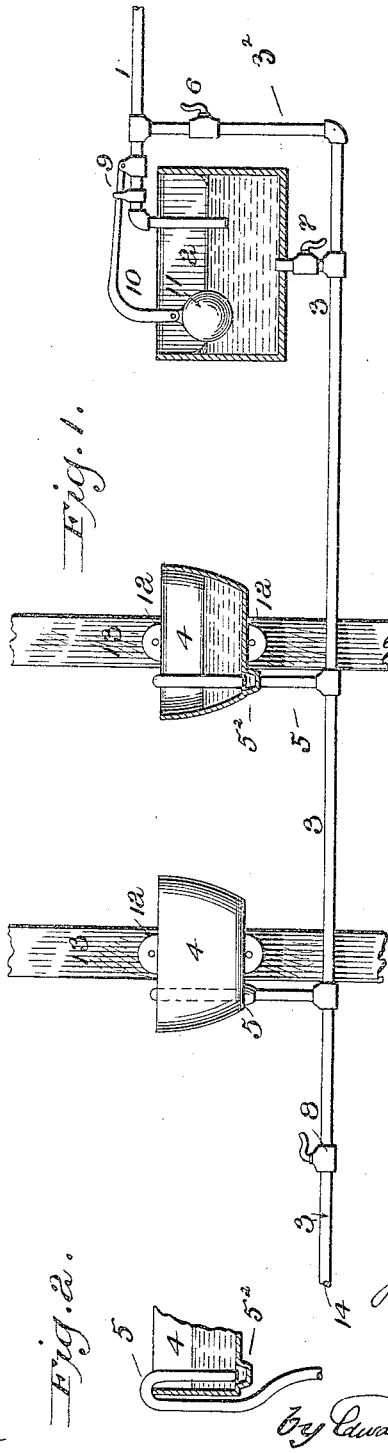

JOHN C. EBERLEY, OF WHITESBOROUGH, NEW YORK.

SIPHON WATER-DISTRIBUTING SYSTEM.

SPECIFICATION forming part of Letters Patent No. 529,547, dated November 20, 1894.

Application filed January 22, 1894. Serial No. 497,668. (No model.)

*To all whom it may concern:*

Be it known that I, JOHN C. EBERLEY, a citizen of the United States, residing at Whitesborough, in the county of Oneida and State of New York, have invented certain new and useful Improvements in Siphon Water-Distributing Systems; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to apparatus for the automatic distribution of water, particularly for the use of domestic animals while in the stables. It is a well known fact to those versed in agricultural sciences, that water and its supply to cattle while wintering in the stable, is an important factor in the production of milk; that water not too cold be furnished is material, but more so is the presence of a natural supply, that is, a supply constantly at hand, and from which the animal may drink at will.

The object of my invention is to provide apparatus that in conjunction with a proper water supply, will accomplish these desirable results.

In carrying out my invention, I provide a basin or tank to retain water for each stall in the stable, or if the conformation of the stalls permits, one such tank for each two stalls, such tank being used in common by the two occupant animals. This basin or tank is attached firmly to the frame of the stalls, and is provided in its bottom with an extra cup or recess, this latter being covered or guarded by a grating. The open end of a siphon supply pipe dips into this latter recess, which, when filled with water, acts as a siphon-seal. The pipes of each drinking basin enter a common supply pipe, the latter entering a feed tank. An extra arm of the common supply-pipe rises higher than the level of the feed-tank, and with the aid of a water head and stop cocks operates to fill the siphon with water, after which the said siphons are self operating.

I will first particularly describe my system of water distribution with reference to the accompanying drawings, and then define the matter constituting my invention in the claim.

In the accompanying drawings, Figure 1 represents my invention shown partly in elevation and partly in section. Fig. 2 is a side view in section of the basin 4 of Fig. 1, and it shows how the siphon enters the said basin and the seal cup already described as being part of the said basin.

The same part is designated by the same numeral in the several figures.

1 represents a pipe of initial supply from which water runs into feed tank 2, the flow therein being regulated by the cut-off valve 9, arm 10 and float 11. This mechanism of the cut-off valve 9 is too old to need more definate description. From the feed tank 2, water is carried through the pipes 3 to basins 4 by means of branch siphons 5 to said pipe 3. The ends of the siphons 5 dip into the seal-cup $5^2$, the reason for which will hereinafter appear. In the pipe 3 are placed stop-cocks 7 and 8, the latter being in all cases between the last basin 4 in the system and the wasteway 14. From a point near the stopcock 7 is a pipe connection $3^2$ between pipes 3 and 1, exterior of tank 2. The said pipe $3^2$ is provided with a stop-cock 6. The basins 4 already described are provided with fastening lugs 12 which permit firm attachment of the said basin to stanchions 13, or other desirable support.

The operation of my invention is as follows: Stop-cocks 7 and 8 are closed, while that at 6 is opened permitting the flow of water direct from pipe 1 through pipe $3^2$, and siphon 5 into basin 4. In the meantime water is maintained in the tank 2 to a fixed level by the operation of the cut-off valve 9. A quantity of water now being in the basin 4, the stop-cock 6 may be closed, and the stop-cock 7 opened, establishing connection between the tank 2 and the basin 4. It will be readily seen that as the water is taken from the basin 4 by the animals, a further supply will be introduced from the feed-tank 2, the water-level between the two basins or vessels being constantly maintained.

In order that the basin 4 may be cleaned at will, the stop-cock before mentioned at 8 is introduced. When it is opened, the water will waste away from the basins 4 to wasteway 14. The basins may be refilled as already described. As it may occur that the animals may take water from the basin 4 faster than it can be supplied by the feed-tank 2 and pipe system, the seal-cups $5^2$ are introduced, these being properly guarded by grating or otherwise.

Having described my invention, what I claim is—

In a siphon water distributing system, the combination with a tank or water supply, a feed tank wherein the level of water is controlled by a float valve, a series of reservoir basins, a series of pipe connections between said feed tank and said reservoir basins, such pipe connections being siphons, a series of stop-cocks in said pipes, and a head pipe for the purpose of filling said siphons for use, substantially as described.

In testimony whereof I affix my signature in presence of two witnesses.

JOHN C. EBERLEY.

Witnesses:
JOHN H. ALLYN,
R. A. JONES.